United States Patent [19]

Bubien

[11] 4,144,840

[45] Mar. 20, 1979

[54] RAISING PELAGIC GAME FISH

[76] Inventor: James K. Bubien, R.F.D. No. 3, Box 215, Dunn's Corner, Westerly, R.I. 02891

[21] Appl. No.: 786,016

[22] Filed: Apr. 8, 1977

[51] Int. Cl.² ............................................. A01K 61/00
[52] U.S. Cl. ......................................................... 119/3
[58] Field of Search ................................... 119/3, 2, 4

[56] References Cited

U.S. PATENT DOCUMENTS

| 3,572,291 | 3/1971 | Cavanagh | 119/3 |
| 3,765,372 | 10/1973 | Moe, Jr. et al. | 119/3 |
| 3,916,832 | 11/1975 | Sweeney | 119/3 |

Primary Examiner—Hugh R. Chamblee
Attorney, Agent, or Firm—David W. Collins

[57] ABSTRACT

Pelagic species of game fish, such as marlin and tuna, are raised from an embryonic, or larval, stage to a juvenile stage by a process and apparatus employing a biologically closed, physically open system. The system is kept biologically closed by first filtering and sterilizing sea water and then growing nutrients for the fish therein. The system is kept physically open by flowing a constant fresh source of sea water through the system to carry nutrient to the fish and to carry waste products out.

15 Claims, 3 Drawing Figures

RAISING PELAGIC GAME FISH

BACKGROUND OF THE INVENTION

1. Field of the Invention

This invention relates to a salt-water fish-farming, or mariculture, process for the raising of pelagic species of game fish and to apparatus useful in that process. More particularly, this invention relates to a process and apparatus employing a biologically closed, physically open system for raising deep water game fish, such as marlin and tuna.

2. Description of the Prior Art

In recent years, it has become evident that the resources of this earth are not without limit. Proper care must be taken to assure that they are not ruined needlessly. The North Atlantic fishery is now in the process of being destroyed by commercial fisherman. Marlin and tuna stocks are down, as are the stocks of most other species. There have been advances in locating and capturing these fish, but nature has not compensated by providing more efficient methods for replacing these fish. There now exists an unnatural state of affairs whereby fish are removed in large numbers and the remaining stocks cannot replace them because the natural reproductive process is simply too inefficient. If harvesting from the sea is to be continued, declining fish stocks must be replaced. The world-wide salmon industry relies on such techniques. It is now time to provide these techniques for the high seas fishery.

There are large gaps in our knowledge of oceanic species of fish. In attempting to carry out investigations in this area, many problems are encountered, such as a small number of specimens for study, difficulty of capture, and considerable expenditures for a relatively small amount of information gained. Very little is known of the early life to tunas and marlin; the statistics on migration may be misleading because of the limited size of the samples. Little is known of the nutritional needs of these fish, and population estimates are little more than guesses. In this regard, a mathematical projection for bluefin tuna has shown a fecundity of approximately fourteen million eggs, with a survival to adulthood of approximately ten to fourteen fish. Losses are related to causes such as bacterial, fungal, parasitic, predation and starvation. It is believed that a similar situation obtains for marlin.

In the present state of the art, mariculture is an expensive and economically unsound venture. It is presently far less expensive to merely capture the fish, as opposed to rearing them from infancy to a marketable size. If, however, the present course of indiscriminate use of the natural resource is continued, mariculture will not only become profitable, it will become necessary.

Many systems and processes are well known for raising fresh water fish, such as trout, or for raising salmon or shrimp; see, e.g., W. C. Yee et al., U.S. Pat. No. 3,735,736, issued May 29, 1973. However, very little is known concerning the raising of pelagic species of oceanic game fish. Certainly, it is easier to contemplate isolating and controlling the environmental conditions of fresh water fish water fish compared with oceanic fish.

Attempts have been made to deal with salt-water fish-farming. For example, J. E. Bromley in U.S. Pat. No. 3,540,415, issued Nov. 17, 1970, discloses a synthetic reef ecological system for installation on the ocean floor to facilitate the colonizing of harvestable fish therefrom. Another synthetic reef is disclosed by P. P. Pranis, Jr., in U.S. Pat. No. 3,898,958, issued Aug. 12, 1975. Such systems are useful in shielding small fish from larger fish. A problem with such systems, however, is that they do not provide an isolated and controlled environment for hatching fish from eggs and nurturing the hatched larvae to a viable stage.

M. A. Moe, Jr., et al. in U.S. Pat. No. 3,765,372, issued Oct. 16, 1973, discloses a mariculture process for raising salt water fishes, whereby a brood stock is isolated in an artificially controlled environment and the temperature and degree of light exposure are adjusted to promote rapid attainment of sexual maturity of the brood stock. Spawning and egg fertilization are then induced by hormone extract, and the fertilized eggs subjected to hatching. The larvae produced from the eggs are then held in a controlled environment to develop them to a viable size.

However, no means of making the feed condition natural for the larvae are disclosed by Moe et al. Consequently, larval fish that do not learn to eat when food is presented to them perish. Further, Moe et al. provide a complicated means for removal of dead or uneaten plankton. Finally, Moe et al. do not provide sufficient control over the water environment of the larval fish so as to optimize growth and development.

Thus, there remains a need for a simple system for raising pelagic game fish which minimizes disease and maximizes both growth and yield of the fish in an isolated and controlled environment.

SUMMARY OF THE INVENTION

In accordance with the invention, a biologically closed, physically open process for raising pelagic game fish is provided. The process comprises:

(1) providing a supply of larval fish;

(2) maintaining the larval fish in a container in a biologically closed, physically open system;

(3) growing a supply of food within the system by mixing nutrients and plankton in sterilized, filtered sea water to form a culture medium;

(4) providing a substantially homogeneous, continuous supply of food to the larval fish by an upflow of the culture medium in the container;

(5) continuously removing toxic waste from the system; and (6) maintaining the larval fish in the system for a period of time sufficient to permit the larval fish to develop into viable juvenile fish.

As used herein, a biologically closed system refers to one in which all living organisms in the system are controlled. A physically open system is one in which there is a continuous flow of water from the environment, through the system, and back to the environment.

Also, in accordance with the invention, biologically closed, physically open apparatus for raising pelagic game fish is provided. The apparatus comprises:

(1) first means for introducing sea water into a biologically closed, physically open system for raising fish from a larval stage to a juvenile stage, including:
  (a) means for sterilizing the sea water, and
  (b) means for filtering the sea water to form a first source of filtered sea water;

(2) second means for introducing sea water into a biologically closed, physically open system for developing a food source for the fish, including,
  (a) means for sterilizing the sea water, and (b) means for filtering the sea water to form a second source of filtered, sterile sea water, the food source system further including, (c) means for mixing nutrients with the second source of filtered, sterile sea water, and (d) means for introducing the mixture of nutrients and sea water to a chamber which includes a mixed plankton culture of phytoplankton and zooplankton to form a concentrated culture medium in which plankton is generated;

(3) means for combining the concentrated culture medium with the first source of filtered, sterile sea water to form a dilute culture medium;

(4) means for containing the fish;

(5) means for introducing the dilute culture medium into the containing means, including means for providing a homogeneous mixture of the culture medium throughout the containing means; and (6) means for removing toxic wastes.

The biologically closed, physically open system of the invention provides a means for increasing the survival rate among young fish so as to partially compensate for the fishing pressure that these fish experience. In addition, the system reduces or prevents hazards to the young fish of disease, predation by larger animals, starvation, environmental changes, and toxic build-up.

DETAILED DESCRIPTION OF THE INVENTION

Figure 1:
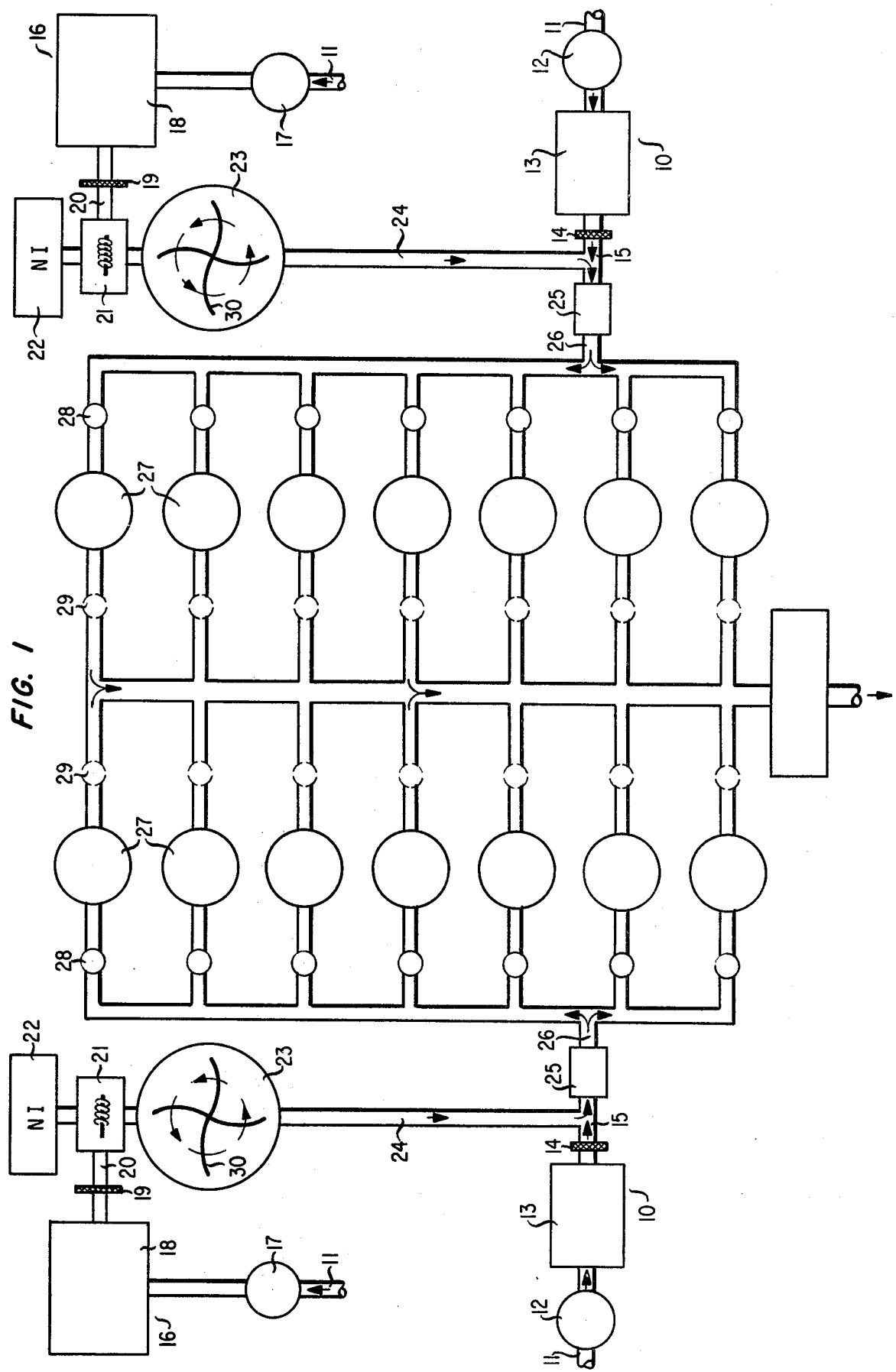
FIG. 1 is a schematic view of apparatus of the invention, depicting two biologically closed, physically open systems in parallel.

Fish eggs and larval fish are very susceptible to bacterial, fungal, and parasitic agents. The problem is accentuated when these eggs are placed in a biologically high density culture situation. In such situations, disease can spread and destroy entire stocks of fish in very short times.

The invention avoids this problem by providing a biologically closed system. The water that enters the system is filtered and sterilized. The food source is grown within the system itself, under sterilized conditions. The fish are separated into several rearing tanks, arranged in parallel with respect to each other to avoid loss of the entire brood crop.

All living organisms excrete materials toxic to themselves. A physically closed system experiences a buildup of these materials, and some type of removal apparatus is necessary. The fish are vulnerable to any type of breakdown of the apparatus that may occur.

The invention avoids this problem by providing a physically open system. Toxic materials are continuously removed from the system, thus preventing buildup of toxic materials.

There is also a continuous turnover of the food supply provided by the process and apparatus of the invention. Fresh food is continuously infused, while old food is constantly removed from the system. The continuous infusion of food allows the fish to forage at will and precludes the possibility of starvation, a problem which exists when food is provided only at specified times.

The food supply is grown within the system itself. The food supply is a colony of mixed phytoplankton and zooplankton grown in a plankton culture chamber. These microorganisms follow a growth curve similar to bacteria in that there is a lag phase, an exponential growth phase, a stationary phase, and a death phase. By regulation of temperature, light and nutrient, the microorganisms are held in the exponential growth phase. They are then reproducing at a particular rate. To keep the colony at the same absolute population, the amount of microorganisms produced per minute must equal the amount of organisms removed from the plankton culture per minute.

The desired plankton concentration in the fish rearing tanks, then, is a function of the rate of plankton production. However, by regulating flow of plankton to the fish, plankton culture chamber volume and nutrient input, the production rate of plankton can be made to accommodate a given concentration of fish in the rearing tanks.

The growth of these microorganisms will produce some undesirable by-products which could have a harmful effect on the fish if present in sufficient quantity. The process and apparatus of the invention minimize this effect by diluting small amounts of plankton culture into relatively large amounts of organism-free water. This organism-free water is nutrient-deficient, and, consequently, growth of plankton, while passing through the rearing system, is minimized.

The needs of the developing larvae apparently are kinetic. The food rearing process and apparatus employed in the invention is able to supply these changing needs. By increasing nutrient input and flow, the concentration of food in the rearing tanks can be raised. Conversely, by lowering the nutrient input and flow, the food supply can be diminished.

In the open ocean, fish larvae are subjected to some turbulence. It may be more or less severe, depending on weather and location. The physical effects of this turbulence is apparently necessary for normal growth and development of the larvae. The apparatus of the invention provides for turbulence in varying degrees. Depending on the needs and responses for the fish being reared, the turbulence can range from zero to severe.

Oxygen is critical for larval fish, and the proper levels must be maintained. The greatest amount of water entering the rearing units is direct from the sea. Oxygen is at its natural concentration. However, the natural concentration may be insufficient to a densely populated rearing tank, and subsequent aeration may be necessary. Such aeration may be provided by conventional means.

The biologically closed, physically open fish raising apparatus of the invention is schematically depicted in FIG. 1. The apparatus depicted shows two systems connected in parallel. Other variations of the apparatus of the invention are also possible. This apparatus is used for raising pelagic species of game fish from an embryonic, or larval, stage. More particularly, this system is used to raise Makaira nigricans (blue marlin) and Makaira indica (black marlin). For these species of Makaira, the larval stage is considered to range from about 2 mm (hatch) to about 100 to 200 mm, while the juvenile stage is considered to be somewhat in excess of about 200 mm. The fish may be reared either from the larval stage or from fish eggs. A portion of the stock may be used for breeding purposes, or the eggs may be obtained from fish in the ocean.

A first means, indicated generally at 10, for introducing sea water 11 into the biologically closed, physically open apparatus of the invention comprises a pump 12, means 13 for sterilizing the sea water, and means 14 for filtering the sea water to form a first source of filtered, sterile sea water 15.

The sterilizing means must be sufficient to destroy 100 percent of any living organisms in order to maintain a biologically controlled system. Electromagnetic energy having a wavelength of about 0.01 to 3,500 Angstrom units is sufficient, with time of exposure adjusted to achieve the desired level of sterilization. Examples include Y-rays, beta rays and ultraviolet radiation. Ultraviolet radiation of about 2,700 to 2,800 Angstrom units, being both effective and inexpensive, is preferred.

The filters must remove particulate matter from the incoming water. Examples include sand beds, glass wool and activated charcoal. Such materials are generally sufficient to remove particles at least 0.5 mm in size. For smaller particles which are able to pass through the filters, conventional methods of chemical coagulation and flocculation may optionally be used to remove such particles.

A second means, indicated generally at 16, for introducing sea water 11 into a biologically closed, physically open sub-system comprises a pump 17, means 18 for sterilizing the sea water, and means 19 to filter the sea water, thus forming a second source of filtered, sterile sea water 20. The sub-system is employed for developing a food source for the fish and further includes means 21 for mixing nutrients from source 22 with the second source of filtered, sterile sea water and means (not shown) for introducing the mixture of nutrients and sea water to a chamber 23. The chamber includes a mixed plankton culture of phytoplankton and zooplankton which may be replenished from time to time through means (not shown) as needed. The mixture of nutrients, sea water and mixed plankton culture forms a concentrated culture medium 24 in which plankton is generated.

Although two separate means are generally described for generating sources of filtered, sterile sea water 15 and 20, it is obvious that the required sources can alternatively be generated by one means, with a divider to separate the output into two streams, one flowing at a rate of about twenty times the other.

The concentrated culture medium 24 is combined with the first source of filtered, sterile sea water 15 by means 25 to form a dilute culture medium 26, which continuously flows through fish rearing tanks 27, connected in parallel with respect to each other, which contain the fish (not shown). Flow regulation valves 28 and, optionally, 29 at the input and output of the tanks serve to control the rate of flow of the dilute culture medium. A flow rate of about 1 gal/min in a 100 gal tank, with turnover of water and food every 100 min is considered sufficient to prevent starvation and to remove toxic wastes.

The output of all tanks is then combined and discharged back to the environment. Optionally, the discharged medium may be treated by filtering, purifying, and the like.

In a large-scale operation, three separate systems, each similar to that depicted in FIG. 1, would be used. One system would be used for rearing small fish from eggs to about 15 mm in length. The second system would be used for rearing fish about 15 to 50 mm in length. The third system would be used for rearing fish about 50 to 150 or 200 mm in length.

PLANKTON CULTURE CHAMBER

Nutrients to the plankton culture chamber 23 are provided by source 22 and are infused into the chamber at a desired rate by a variable speed pump (not shown). Nutrients include phosphates, nitrates, essential trace elements, sugars, and the like, and are introduced in amounts to compensate for nutrient-deficient source sea water.

The nutrients are conveniently mixed with the second source of filtered, sterile sea water 20 by means 21 which conveniently comprises an internal mixing apparatus. This is an in-line mixer which provides more thorough and efficient mixing than is otherwise possible with other types of mixing tanks.

Figure 2:
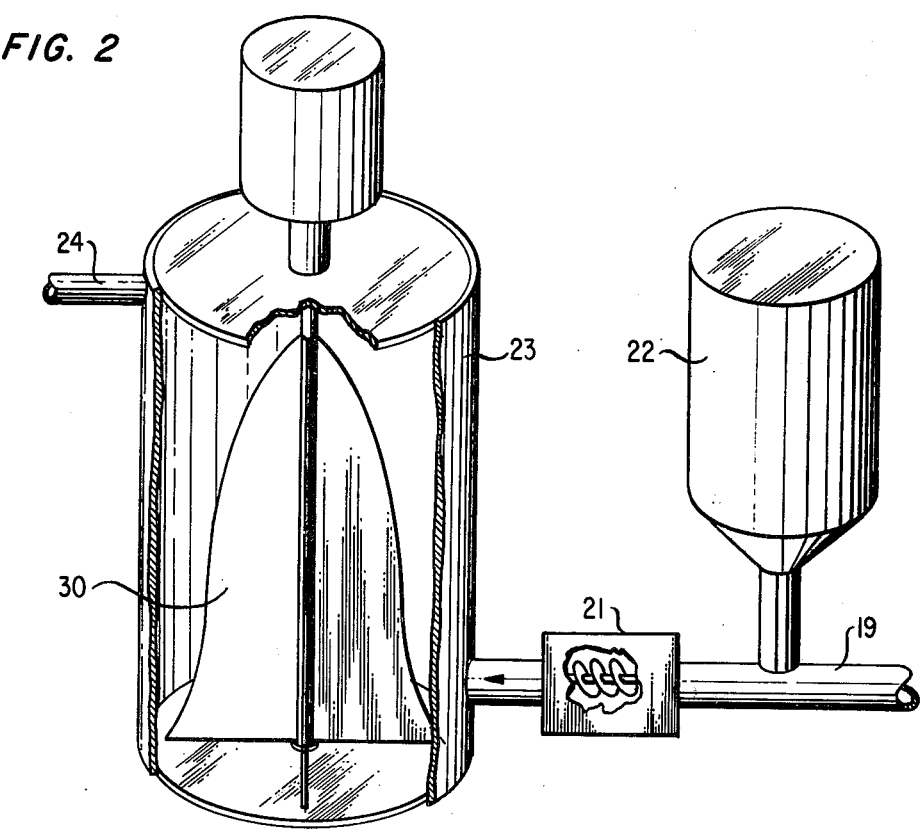
FIG. 2 is a perspective view of a preferred chamber in which a concentrated culture medium is formed.

In the plankton culture chamber 23, the mixture of nutrients and sea water is conveniently introduced at the bottom and is continuously mixed by a central rotor 30, as shown in greater detail in FIG. 2. Energy for plankton growth is provided by sunlight, which may be augmented by artificial light, if desired. The chamber is completely enclosed to maintain a biologically closed condition.

Both phytoplankton and zooplankton are grown in the plankton culture chamber, typically in a mass ratio of about 9:1 to 11:1, and preferably in a ratio of about 10:1, of phytoplankton to zooplankton. Examples of suitable phytoplankton include oscillatoria, ditylum and gymnodinium; examples of zooplankton include calanoid copepods, bolinopsis and dexiobranchaea. A density of about 3,000 microorganisms/1, or about 11,300 microorganisms/gal, is considered sufficient to supply seven 100 gal fish tanks simultaneously. The microorganisms are maintained in an exponential growth phase by infusing nutrients and withdrawing microorganisms at a rate such that the concentration of microorganisms remains constant. The concentrated culture medium 24 exits from the top of the chamber with outflow of the culture medium equal to production rate of plankton. The culture medium is distributed to the rest of the system by gravity feed, by pumps, or the like. Gravity feed is preferred so as to avoid passing plankton through pumps.

After leaving the plankton culture chamber, the concentrated culture medium is combined with the first source of filtered, sterile sea water 15 by means 25, typically internal mixing apparatus, to form the dilute culture medium 26. The dilution is about 15:1 to 25:1, preferably about 20:1, parts by volume. The dilution is sufficient to dilute any toxic matter produced by the plankton and yet ensure an adequate supply of food for the fish of about a 10:1 biomass ratio.

At this stage, the medium may be heated or cooled by conventional means (not shown) to maintain the temperature of the medium between about 24 degrees to 30 degrees C., which is necessary for hatching fish eggs and for the early stages of growth. Aeration may also be provided as necessary.

In the plankton culture system, problems may be encountered when attempting to regulate a mixed culture. This has to do with the individual rates of growth of each population of plankton. Species "a" may grow at a rate whereby the number of individuals in the population doubles every one hour, and the biomass of the population doubles every 2 hours. Species "b" may double its number every 12 hours, and its biomass every 15 hours. In a mixed system, where species "a" is the food source for species "b", a balance may be obtained, but species "b" most likely will be crowded out by species "a". In the reverse situation, species "a" may starve, and the overall yield of the system thereby greatly reduced.

An estimate of the production in a time "t" for each population under identical conditions can be determined from the following equations:

$$W_t = W_o e^{kt} \text{ (weight gain)} \quad (1)$$

$$N_t = N_o e^{-it} \text{ (loss through mortality)} \quad (2)$$

$$R = kN_oW_o/k-i \, (e^{t(k-i)}-1) \text{ (production of system)} \quad (3)$$

where k = instantaneous rate of weight gain;
i = instantaneous mortality (natural) rate;
N = number of individuals;
W = weight of individual organism;
R = net production rate of system.

Since the coefficients "k" and "i" will differ among species of the plankton culture, apparatus may be necessary to deliver the proper mixture and quantity of plankton to the larval marlin. This modification would comprise a group of plankton culture chambers growing individual species at their individual rates. Through flow regulation, the effluent would be made to contain the plankton at the desired concentration. Of course, volumes of these chambers may differ from one another, also. Many variations such as this can be envisioned. The number of chambers, their size, and the flow and nutrient input are dependent upon the rates of growth, mortality, and nutrient utilization of the organisms themselves.

FISH TANKS

Figure 3:
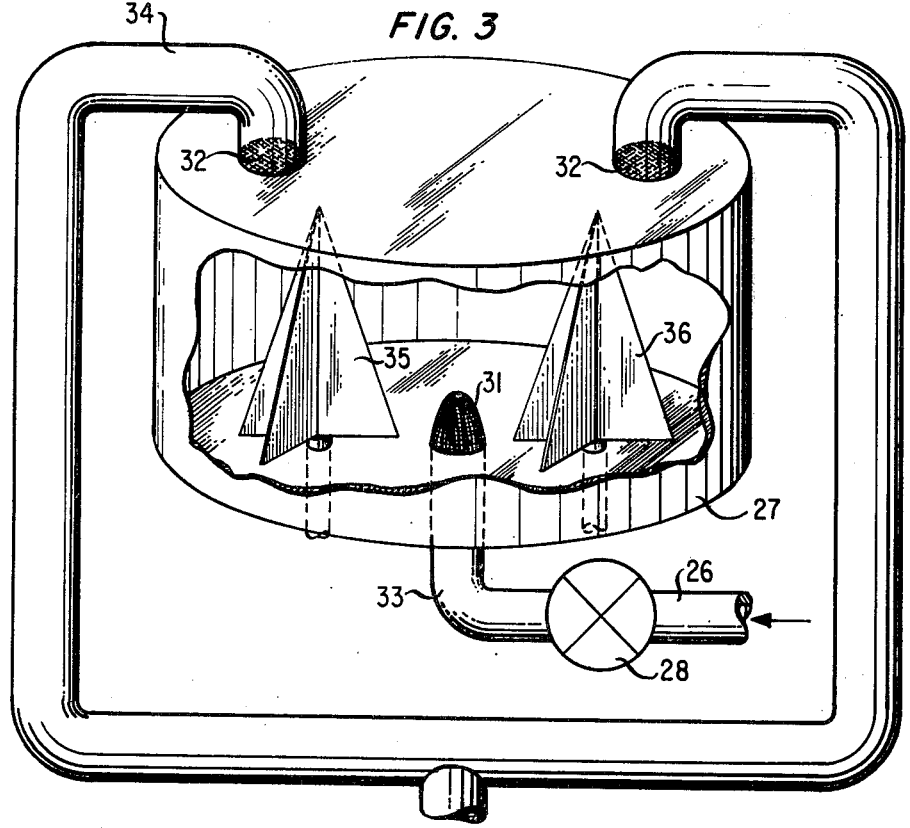
FIG. 3 is a perspective view of a preferred fish-containing means employed in the practice of the invention.

The dilute culture medium 26 is then fed to a plurality of fish rearing tanks 27, connected in parallel. FIG. 3 depicts in greater detail on such tank. Flow regulation valve 28 may be used to control flow of the dilute culture medium.

The size and number of the tanks is not critical. However, since fish grow better in larger tanks and since it is easier to regulate stocking density in larger tanks, then tanks at least about 100 gal are advantageously used.

Selective filters 31 and 32 may be employed in both inlet portion 33 and outlet portion 34, respectively, to remove particles greater than about 1 mm in size, while permitting inflow of plankton (typically about 0.2 to 0.5 mm in size). The outlet filters prevent egress by the fish. The tanks are completely enclosed to maintain a biologically closed condition.

Variable speed rotors 35 and 36 are preferably employed to provide graded turbulent motion of water by moving the water faster at the bottom of the tank. The rotors rise to about 50 to 60 percent of the tank height. This provides a relatively quiescent area near the top of the tank where the eggs and larval fish reside. The rotors also provide a homogeneous mixture of foods to all portions of the tank. The rotors are driven at a substantially identical rate of speed by means not shown.

Discharge from all tanks is combined and released back to the sea, as described earlier.

Upon reaching a sufficient viable size, the juvenile fish are released into the sea. For species of Makaira, this size is about 200 mm and larger.

EXAMPLE

A system for raising pelagic game fish is constructed as substantially depicted in FIGS. 1-3 and comprises 14 tanks, each of 100 gal capacity. A population of 50,000 larval fish are distributed in the 14 tanks at a stocking density of about 35 fish/gal. There is one complete change of water per hour, or a flow of 33,600 gal/day.

An optimum concentration of plankton in the fish tanks for the given stocking density of fish is 11,340 organisms/gal, or 1,134,000 organisms/tank, with a flow of dilute nutrient to each tank of 1.67 gal/min. To achieve this concentration and flow, the plankton culture chamber produces 263,995 organisms/min. At a flow of 3 gal/min through the plankton culture chamber, there is a density of 87,998 organisms/gal in the chamber. For a volume of 1,000 gal, each organism reproduces itself every 333.3 min. As the fish grow in size, the concentration of plankton is increased in order to maintain a biomass ratio of about 10:1 of plankton to fish.

Under these growth conditions, a substantial portion of larval fish are raised to the juvenile stage and then released into the sea.

Various changes and modifications apparent to those skilled in the art may also be made without departing from the spirit and scope of the invention.

What is claimed is:

1. A biologically closed, physically open process for raising pelagic game fish which comprises:
   (1) providing a supply of larval fish;
   (2) maintaining the larval fish in a container in a biologically closed, physically open system;
   (3) growing a supply of food within the system by mixing nutrients and plankton in sterilized, filtered sea water to form a culture medium;
   (4) providing a substantially homogeneous, continuous supply of food to the larval fish by an upflow of the culture medium in the container;
   (5) continuously removing toxic waste from the system; and
   (6) maintaining the larval fish in the system for a period of time sufficient to permit the larval fish to develop into viable juvenile fish.

2. The process of claim 1 which further comprises releasing viable juvenile fish into the ocean.

3. The process of claim 1 which further comprises providing a supply of larval fish by introducing fertilized fish eggs into the system.

4. The process of claim 1 in which the nutrients comprise a mixture of phosphates, nitrates, trace elements and sugars.

5. The process of claim 1 in which the plankton comprises a mixture of phytoplankton and zooplankton in a ratio of about 9:1 to 11:1 of phytoplankton to zooplankton.

6. The process of claim 1 in which the sea water is sterilized by electromagnetic radiation having a wavelength of about 0.01 to 3,500 Angstrom units.

7. The process of claim 6 in which the sea water is sterilized by ultraviolet radiation having a wavelength of about 2,600 to 2,700 Angstrom units.

8. The process of claim 1 in which the homogeneous, continuous supply of food is provided by graded turbulent motion in the container.

9. The process of claim 1 in which the pelagic game fish is a species of Makaira.

10. A biologically closed, physically open apparatus for raising pelagic game fish which comprises;
(1) first means for introducing sea water into a biologically closed, physically open system for raising fish from a larval stage to a juvenile stage, including:
 (a) means for sterilizing the sea water, and
 (b) means for filtering the sea water to form a first source of filtered, sterile sea water;
(2) second means for introducing sea water into a biologically closed, physically open sub-system for developing a food source for the fish, including
 (a) means for sterilizing the sea water, and
 (b) means for filtering the sea water to form a second source of filtered, sterile sea water, the food source system further including
 (c) means for mixing nutrients with the second source of filtered, sterile sea water, and
 (d) means for introducing the mixture of nutrients and sea water to a chamber which includes a mixed plankton culture of phytoplankton and zooplankton to form a concentrated culture medium in which plankton is generated;
(3) means for combining the concentrated culture medium with the first source of filtered, sterile sea water to form a dilute culture medium;
(4) means for containing the fish;
(5) means for introducing the dilute culture medium into the containing means, including means for providing a homogeneous mixture of the culture medium throughout the containing means; and
(6) means for removing toxic waste.

11. The apparatus of claim 10 in which the means for sterilizing the sea water comprises electromagnetic radiation having a wavelength of about 0.01 to 3,500 Angstrom units.

12. The apparatus of claim 11 in which the means for sterilizing the sea water comprises ultraviolet radiation having a wavelength of about 2,700 to 2,800 Angstrom units.

13. The apparatus of claim 10 in which the ratio of phytoplankton to zooplankton ranges from about 9:1 to 11:1.

14. The apparatus of claim 10 in which a homogeneous mixture of the dilute culture medium throughout the containing means is provided by graded turbulent motion.

15. The apparatus of claim 10 in which the pelagic game fish is a species of Makaira.

* * * * *